Sept. 24, 1957 P. W. COOK 2,807,507
WHEEL ATTACHING BRACKETS
Filed Dec. 2, 1955 2 Sheets-Sheet 1

INVENTOR.
Paul W. Cook

Sept. 24, 1957  P. W. COOK  2,807,507
WHEEL ATTACHING BRACKETS
Filed Dec. 2, 1955  2 Sheets-Sheet 2

INVENTOR.
Paul W. Cook

United States Patent Office 2,807,507
Patented Sept. 24, 1957

2,807,507
WHEEL ATTACHING BRACKETS
Paul W. Cook, Adrian, Minn.
Application December 2, 1955, Serial No. 550,661
4 Claims. (Cl. 301—36)

This invention relates to brackets for attaching the tire and rim to row-crop tractors having dual front wheels or wide front axles.

It is an object of the present invention to provide brackets for attaching secondary tires and rims to row-crop tractors having dual front wheels or wide front axles.

It is another object of the present invention to provide wheel attaching brackets of the above type which will prevent the front end of the tractor from sinking in soft places.

It is still another object of the present invention to provide wheel attaching brackets of the above type which are applicable to most wheel type tractors.

It is still another object of the present invention to provide wheel attaching brackets of the above type which can be put on without disturbing any part of the regular front wheels of the tractor and which is particularly designed for farm tractors working in soft places and having heavy front end equipment.

Other objects of the present invention are to provide wheel attaching brackets bearing the above objects in mind which are of simple construction, have a minimum number of parts, are inexpensive to manufacture and efficient in use.

For other objects and a better understanding of the invention, reference may be had to the following detailed description taken in connection with the accompanying drawing, in which.

Figure 1:
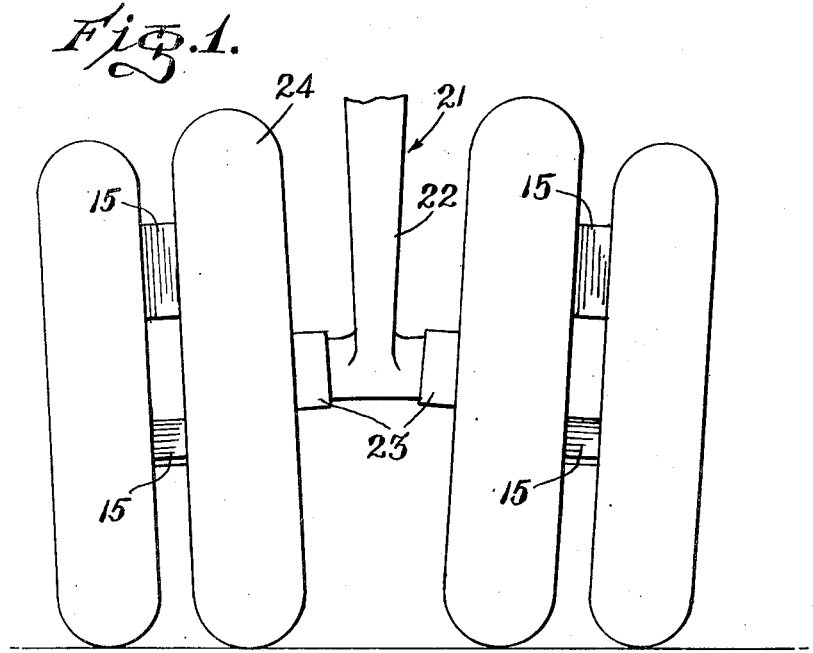
Figure 1 is a fragmentary front elevational view of a tricycle row crop tractor showing the invention in operative use thereon.
Figure 2:
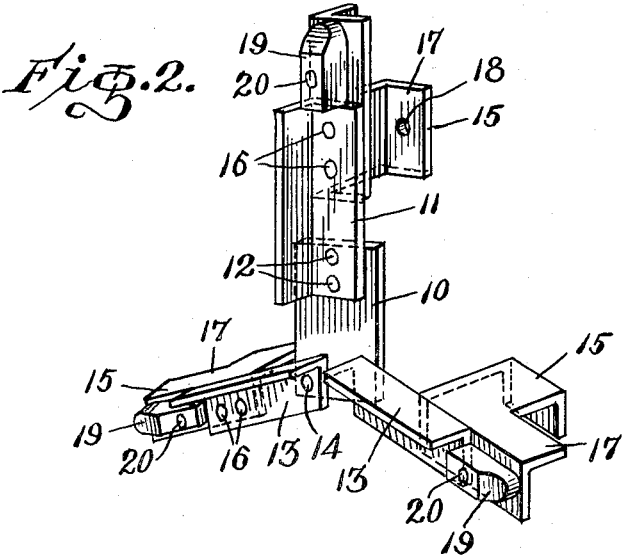
Fig. 2 is a perspective view shown alone of the attaching brackets comprising the invention.
Figure 3:
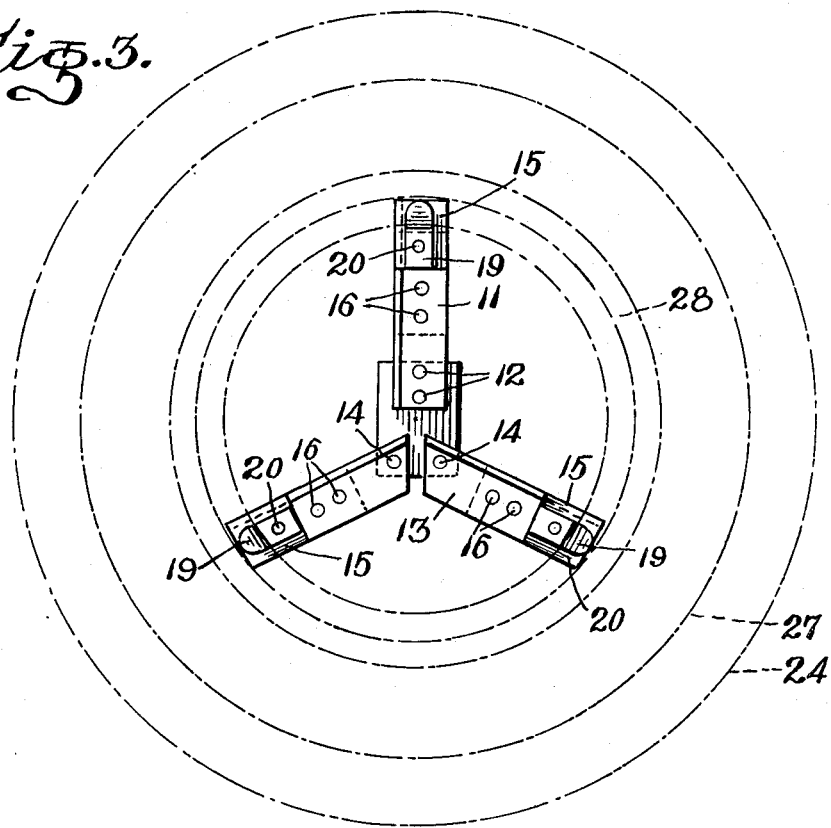
Fig. 3 is an outside elevational view of the brackets showing in phantom the wheel rim and tire and Fig. 4 is a front elevational view of the bracket and showing in phantom the regular and auxiliary tires and rims in operative engagement therewith.

Referring now more in detail to the drawing, 10 represents a rectangular plate hub, to the upper end of which on the outside thereof is secured a square end, angle iron spoke 11 by means of the bolts 12, substantially as illustrated.

A pair of diagonal end angle iron spokes 13 are secured to the lower end of the hub plate 10 by means of the bolts 14, extending downwardly and outwardly therefrom.

A channel iron 15 is mounted at the outer end of each of the angle iron spokes 11 and 13 on the inner faces thereof by means of the bolts 16, extending outwardly therebeyond, substantially as illustrated. Each of the channel irons 15 at the end and side thereof remote from the angle iron spokes is provided with a rectangular cut out 17.

The spoke iron angles 11 and 13 and the channel-irons 15 are provided with the laterally aligned openings 18.

Spacers 19 may be welded or otherwise secured to the channel irons 15 to permit the brackets to be offset inwardly with respect to the rim of the secondary wheels, as will hereinafter become clear. The spacers 19 and channel irons 15 are provided with the bolt openings 20 therethrough.

Figure 4:
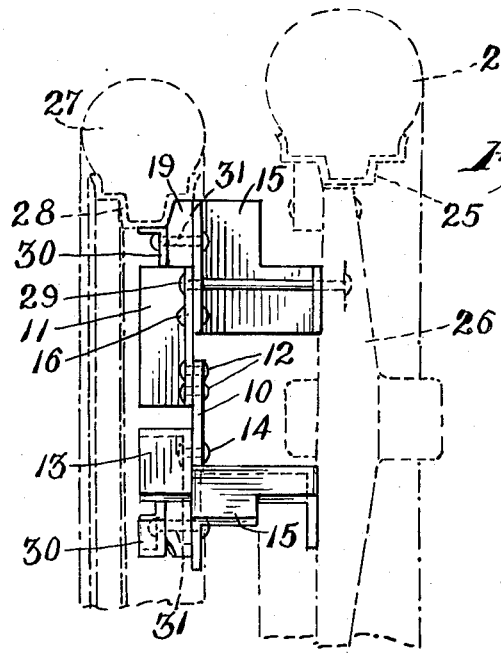

Referring now particularly to Figs. 1 and 4, there is shown a tricycle row crop tractor indicated generally at 21 of conventional design including the steering post 22 and spindles 23 as well as the conventional front wheel tires 24, rims 25 and wheels 26. There is also shown the secondary tires 27 and their respective rims 28.

In operation, the channel irons 15 are secured to the outer face of the regular wheel 26 by means of the bolts 29 which extend through the laterally aligned openings 18 and through the openings in the wheel 26 normally intended for wheel weights, three such bolts being provided for each bracket.

The detachable rims 28 are provided with the inwardly extending lugs 30 which are secured to the channel irons 15 and spacers 19 by means of the bolts 31 to complete the attachment. Three such bolts 31 are provided for each bracket. Thus, by simply loosening and moving the bolts 29 and 31, the secondary rims, tires and the attaching brackets may be removed from the regular wheels.

The attaching brackets were mounted on a Farmall H tractor and were tested during the winter scooping snow with a manure loader and snow bucket attachments. The smaller outside wheels 27, 28 are necessary so that the ground pressure is not quite as great on it as the regular wheel 24, 25, 26. The tilt of the regular wheel tends to bring the outer wheel in contact with the ground even though the latter are smaller.

Although the attachment has been shown assembled by means of bolts, it may alternately be welded or riveted. It will be apparent that the attachment may be put on without disturbing any part of the regular front wheels.

While various changes may be made in the detail construction, it shall be understood that such changes shall be within the spirit and scope of the present invention as defined by the appended claims.

What I claim as new and desire to protect by Letters Patent of the United States is:

1. A bracket for attaching a tire and rim to row crop tractors or the like comprising a central hub plate, spoke means angularly spaced, means for securing said spoke means to said hub plate on the outer face thereof, spacer means connected to said spoke means on the inner faces thereof, means for attaching said spacer means to the regular wheel of the tractor, and means for attaching said spacer means to a secondary rim having a tire thereon, said spoke means comprising a first angle iron secured to the outside of said hub plate at the upper end thereof, and a pair of second angle irons having beveled inner ends secured to the lower corners of said hub plate, the inner ends of said second angle irons extending substantially parallel to the sides of said first angle iron.

2. A bracket according to claim 1, said spacer means comprising a channel iron secured to the inner faces of each of said angle irons at the upper ends thereof and extending outwardly therebeyond, said means for securing said spacer means to the regular wheel of the tractor comprising said angle irons and said channel irons having laterally aligned openings and bolt means passing through said laterally aligned openings and through the openings in the regular wheel provided for carrying weights.

3. A bracket according to claim 2, said means for securing said spacer means to the secondary rim comprising inwardly extending lugs carried by the secondary rim, spacer members secured to the outer ends of said channel irons on the outer faces thereof outwardly of said angle irons, said lugs, spacers and channel irons having aligned openings and bolt means in said openings.

4. The combination with a row crop tractor or the like having dual front wheels, of a pair of secondary rims of less diameter than the tractor rims and having tires of less diameter than the front wheels of the tractor, and bracket means for mounting said secondary rims on the outside of the regular wheel plates, said bracket means comprising a central hub plate, a plurality of angularly spaced angle irons secured to the outer face of and extending outwardly of said hub plate, channel irons secured to the inner faces of said angle irons outwardly of said hub plate, said angle irons and channel irons having aligned openings therethrough, said channel irons extending outwardly beyond said angle irons, spacers on the outwardly extended ends of said channel irons outwardly of said angle irons, said spacers and extended ends having aligned openings, inwardly extending lugs on said secondary rims having openings aligned with said spacer and channel iron openings, first bolt means connecting said lugs, spacers and channel irons, and second bolt means connecting said angle irons, channel irons and the wheel plate of the regular wheel.

References Cited in the file of this patent

UNITED STATES PATENTS

| | | |
|---|---|---|
| 1,011,852 | Robertson | Dec. 12, 1911 |
| 1,437,106 | Johnson | Nov. 28, 1922 |
| 1,712,322 | Bachrach | May 7, 1929 |
| 2,513,584 | O'Leary | July 4, 1950 |
| 2,609,247 | Carter | Sept. 2, 1952 |